(No Model.)
C. H. REED.
BICYCLE LOCK.
No. 592,481. Patented Oct. 26, 1897.
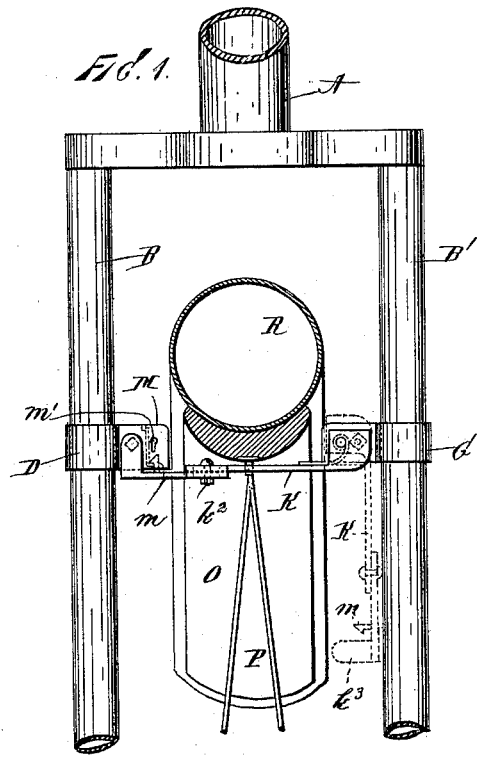
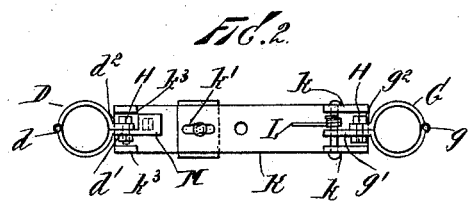
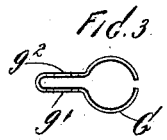
WITNESSES:
John Buckler,
C. Gerst
INVENTOR
Carroll H. Reed,
BY Edgar Tate & Co
ATTORNEYS.

UNITED STATES PATENT OFFICE.

CARROLL HERBERT REED, OF NEW YORK, N. Y.

BICYCLE-LOCK.

SPECIFICATION forming part of Letters Patent No. 592,481, dated October 26, 1897.

Application filed October 21, 1895. Serial No. 566,434. (No model.)

*To all whom it may concern:*

Be it known that I, CARROLL HERBERT REED, a citizen of the United States, and a resident of New York, in the county of New York and State of New York, have invented certain new and useful Improvements in Bicycle-Locks, of which the following is a specification, reference being had to the accompanying drawings, forming a part thereof, in which similar letters of reference indicate corresponding parts.

This invention relates to bicycle-locks; and the object thereof is to provide an improved device of this class by which the wheels of a bicycle may be locked to the frame; and with this and other objects in view the invention consists in the construction, combination, and arrangement of parts hereinafter described and claimed.

The invention is fully disclosed in the following specification, of which the accompanying drawings form a part, in which—

Figure 1 is an elevation of a part of the frame of a bicycle, showing a part of the wheel in section and my improved lock connected therewith. Fig. 2 is a plan view of the lock, and Fig. 3 represents a modified form of construction.

In the accompanying drawings, A represents a portion of the forward upright fork of a bicycle, to which the handle-bar (not shown) is attached, and B and B' the forward forks, which support or connect with the axle of the forward or guide wheel, a portion of which is shown in section in Fig. 1, and in the practice of my invention I provide a lock comprising two rings or bands D and G, each of which is composed of two equal portions which are hinged together at $g$ and $d$, respectively, and each of which is provided at its opposite side with jaws $g'$ and $g^2$ and $d'$ and $d^2$, respectively. These jaws are held together by bolts and nuts H, and the jaw $g'$ is longer than the jaw $g^2$, and the jaw $d'$ is longer than the jaw $d^2$, and pivotally connected with the jaw $g'$ is a plate K, having at one end upwardly-directed jaws $k$, through which the pivotal pin passes, and secured to the said pivotal pin is a spring L, one end of which is adapted to bear upon said plate and to bear it downwardly into the position shown in dotted lines in Fig. 1.

The plate K is composed of sections which are united by means of longitudinal slots $k'$, formed in the adjacent ends thereof, through which is passed a bolt $k^2$, and the outer end thereof is also provided with upwardly-directed jaws $k^3$, which are designed to inclose and conceal the nut or nuts on the bolt H, which secures the separate parts of the ring or band D together, and the jaws $k$ on the plate K also inclose and conceal the nut on the bolt H, which secures the jaws $g'$ and $g^2$ of the ring or band G together, and by means of this arrangement said bolts or nuts cannot be interfered with or the device detached from the machine when the wheel is locked.

The inner end of the jaw $d'$ is provided with a lock M, which is adapted to receive a latch $m$, secured to the outer section of the plate K, and this lock may be of any desired construction, and in the operation thereof a key is inserted at $m'$; and the object in forming the plate K in sections, which are longitudinally adjustable is to provide means whereby my improved lock may be connected with machines of different makes in which the width of the fork or the rods B and B' sometimes vary.

In the construction shown in Fig. 1, O designates the rim of the wheel, and P the spokes thereof, the tire being shown at R, and the operation will be readily understood from the foregoing description when taken in connection with the accompanying drawings. The rings or bands D and G are connected with the rods B and B', as will be readily understood, and the plate K is raised into the position shown in Fig. 1, in which it passes between the spokes of the wheel, and the free end thereof is locked to the opposite ring or band, and whenever it is desired to lock the machine said plate is raised and locked in the position shown in dotted lines in Fig. 1, and when the machine is locked in the manner described the bolts and nuts $k$, by which the rings or bands D are held in place, cannot be interfered with, by reason of the jaws $k$ and $k^3$, as hereinbefore described.

The construction shown in Fig. 3 is a modified form of the clamps or bands G, and in this form said clamps or bands consist of a yoke or looped ring open at one side and provided with a loop or yoke at the other, which constitute the jaws $g'$ and $g^2$, and the operation of this form of construction will be readily understood without further description.

Although I have described my improved lock as connected with the forward fork of a bicycle, it is evident that it may be applied to the rear fork and wheel in the same manner without changing the construction, and it may also be applied to the forks which connect the wheels with the pedal-shaft, as will be readily understood.

Having fully described my invention, I claim and desire to secure by Letters Patent—

1. A bicycle-lock, the same comprising rings or bands D and G, hinged respectively at $d$, and $g$, and each of which is provided respectively with jaws $g'$ and $g^2$ and $d'$ and $d^2$, bolts H, plate K having jaws $k$, and $k^3$ longitudinal slots $k'$ adapted to receive a bolt $k^2$, springs L, lock M; and latch $m$, combined substantially as shown and described and for the purpose set forth.

2. A bicycle-lock, comprising two rings or bands, which are adapted to be detachably connected with the rods which compose one of the forks, of the machine, and each of said rings or bands being provided with jaws, which project inwardly, a plate pivoted or hinged to one of said rings or bands, and adapted to be locked to the opposite one, and to be passed between the spokes of one of the wheels, said plate being provided at each end with upwardly-directed jaws which conceal the jaws formed on the rings or bands, and means for locking the plate in position, said plate being provided at its pivoted or hinged end with a spring which is adapted to hold it adjacent to the rod, with which it is connected, when the lock is not in operation, substantially as shown and described.

3. A bicycle-lock, comprising two rings or bands, which are adapted to be detachably connected with the rods which compose one of the forks, of the machine, and each of said rings or bands being provided with jaws, which project inwardly, a plate pivoted or hinged to one of said rings or bands, and adapted to be locked to the opposite one, and to be passed between the spokes of one of the wheels, said plate being provided at each end with upwardly-directed jaws, which conceal the jaws formed on the rings or bands, and means for locking the plate in position, said plate being provided at its pivoted or hinged end with a spring which is adapted to hold it adjacent to the rod with which it is connected when the lock is not in operation, said plate being also composed of sections, which are longitudinally adjustable, substantially as shown and described.

4. A bicycle-lock, comprising two rings or bands, which are adapted to be detachably connected with the rods which compose one of the forks, of the machine, and each of said rings or bands being provided with jaws, which project inwardly, a plate pivoted or hinged to one of said rings or bands, and adapted to be locked to the opposite one, and to be passed between the spokes of one of the wheels, said plate being provided at each end with upwardly-directed jaws, which inclose the jaws formed on the rings or bands and means for locking the plate in position, said plate being provided at its pivoted or hinged end with a spring which is adapted to hold it adjacent to the rod with which it is connected when the lock is not in operation, and said plate being also composed of sections, which are longitudinally adjustable, and the jaws formed on said rings or bands, being united by bolts or nuts, and the shoulders formed on each end of said plate, being adapted to conceal said bolts or nuts when the lock is not in use, substantially as shown and described.

In testimony that I claim the foregoing as my invention I have signed my name, in presence of the subscribing witnesses, this 14th day of October, 1895.

CARROLL HERBERT REED.

Witnesses:
C. GERST,
M. A. KNOWLES.